(12) United States Patent
Chen

(10) Patent No.: US 6,762,755 B2
(45) Date of Patent: Jul. 13, 2004

(54) METHOD AND APPARATUS FOR CREATING AND DISPLAYING INTERACTIVE THREE DIMENSIONAL COMPUTER IMAGES

(75) Inventor: Jiunn Chen, East Hills, NY (US)

(73) Assignee: Pixel Science, Inc., Roslyn, NY (US)

(*) Notice: Subject to any disclaimer, the term of this patent is extended or adjusted under 35 U.S.C. 154(b) by 208 days.

(21) Appl. No.: 09/976,140

(22) Filed: Oct. 12, 2001

(65) Prior Publication Data

US 2002/0105513 A1 Aug. 8, 2002

Related U.S. Application Data

(60) Provisional application No. 60/240,746, filed on Oct. 16, 2000.

(51) Int. Cl.[7] .............................................. G06T 15/00
(52) U.S. Cl. ....................................................... 345/419
(58) Field of Search ................................ 345/419, 426, 345/427, 619; 382/108, 154, 280, 293

(56) References Cited

U.S. PATENT DOCUMENTS

| | | | |
|---|---|---|---|
| 5,857,119 A | 1/1999 | Borden | 396/5 |
| 6,057,856 A | 5/2000 | Miyashita et al. | 345/435 |
| 6,128,405 A | 10/2000 | Fujii | 382/154 |
| 6,343,184 B1 * | 1/2002 | Huebner | 396/3 |
| 6,529,627 B1 * | 3/2003 | Callari et al. | 382/154 |

* cited by examiner

*Primary Examiner*—Phu K. Nguyen
(74) *Attorney, Agent, or Firm*—Dilworth & Barrese, LLP

(57) ABSTRACT

Disclosed is a system and method for creating and displaying interactive three dimensional (3D) computer images. In a preferred embodiment of the system a plurality of digital cameras are positioned in a single arcuate vertical plane, aimed at a center of an object to be imaged in the center of a rotating turntable. Images of the object are captured by each of the cameras after the turntable rotates a certain number of degrees, until the object has rotated a complete 360 degrees. The captured images are then sent to a computer where they are stored and from them, virtual images are created. These original images and virtual images are then compressed and re-sampled in order to be interactive 3D computer images. The 3D images of the object are then displayed and manipulated by the view through using a computer controller, such as a mouse, and various control icons.

17 Claims, 7 Drawing Sheets

METHOD AND APPARATUS FOR CREATING AND DISPLAYING INTERACTIVE THREE DIMENSIONAL COMPUTER IMAGES

PRIORITY

This application claims priority to a U.S. Provisional Application entitled "Method and Apparatus for Creating Interactive Three Dimensional Computer Images and Display Thereof" filed with the U.S. Patent and Trademark Office on Oct. 16, 2000 and assigned Ser. No. 60/240,746.

BACKGROUND OF THE INVENTION

1. Field of the Invention

The present invention generally relates to computerized graphics, and in particular, to a method and apparatus for creating and manipulating interactive three dimensional (3D) computer images.

2. Description of the Related Art

Early computers dealt primarily with the processing and displaying of text and numbers, such as word processing and mathematical computations. The advances in computer graphics have extended the range of capabilities for the user. Objects can now be displayed in three dimensional (3D) representation, for example in wire frame, solid and/or shaded forms.

Computer graphics enable simulation, on a display screen, of a displayable object. For example, a computer graphics system enables a user such as a designer to generate an image of a 3D object, such as a chair, for an example. Most computer graphic systems will then allow the user to move the image of the chair around the screen, even permitting the user to turn the chair around, turn the chair upside down, or rotate the chair about any of several possible axes.

The ability to move a displayed object is advantageous in computerized graphics. Such movement enables the viewer to see the different aspects of the displayed object. Being able to see the graphically displayed object from other perspectives is important, for example, when purchasing an item over the Internet. This enables consumers of items over the Internet to be more informed on their buying decisions. Therefore, a need exists for an efficient and cost effective system and method for creating and displaying 3D images.

SUMMARY OF THE INVENTION

It is, therefore, an object of the present invention to provide a system and method for creating and displaying three dimensional (3D) computer images.

It is another object of the present invention to provide interactive 3D computer images that a viewer can manipulate to better visualize the object being imaged.

To achieve the above objects, there is provided a system and method for creating and displaying interactive 3D computer images. In a preferred embodiment of the system a plurality of digital cameras are positioned in a single arcuate vertical plane, aimed at an object to be imaged in the center of a rotating turntable. Images of the object are captured by each of the cameras after the turntable rotates a certain number of degrees, until the object has rotated a complete 360 degrees. The captured images are then sent to a computer where they are stored and from them, virtual images are created. These original images and virtual images are then compressed and re-sampled in order to be interactive 3D computer images. The 3D images of the object are then displayed and manipulated by the view through using a computer controller, such as a mouse, and various control icons.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to accompanying drawings. In the following description, well-known functions or constructions are not described in detail since they would obscure the invention in unnecessary detail.

In the present invention, a preferred method for creating and displaying interactive three dimensional computer images comprises the steps of: studio processing an object; computer processing images; sphering the object; image re-sampling and compression; and interactively displaying the three dimensional image. The preferred embodiment and method of the invention will be described herein below.

I. Studio Processing an Object

Figure 1:
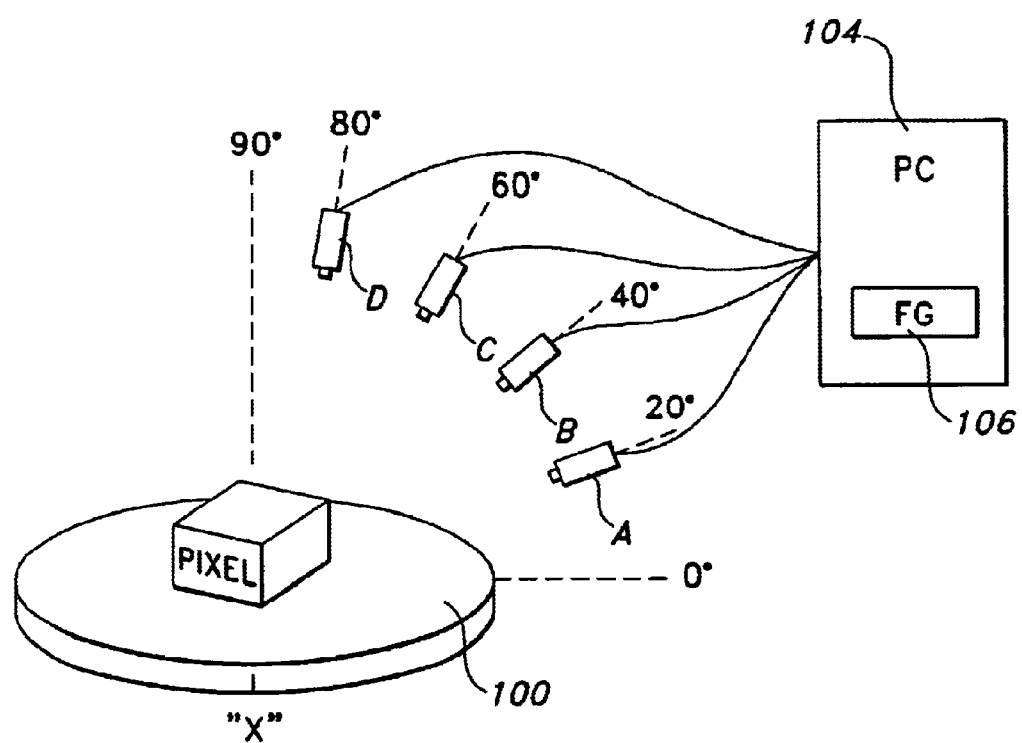
FIG. 1 is a diagram illustrating a preferred embodiment of the present invention.

FIG. 1 is a diagram illustrating a preferred embodiment of the present invention. In FIG. 1, a plurality of cameras (in this case four digital cameras) A, B, C, and D are fixed in a single arcuate vertical plane, spaced apart from each other, preferably 20 degrees apart. In the preferred embodiment, camera A is fixed at an angle of 20 degrees from the horizontal. As a result, camera B is position at 40 degrees, camera C is positioned at 60 degrees, and camera D is positioned at 80 degrees. In an alternative embodiment, the cameras may be place in a same plane not necessarily vertical, for example, at 45 degrees. The four cameras A–D are aimed at the center of a turntable 100, which is rotatable 360 degrees. An object 50 to be studio processed is placed in the center of the turntable 100 to be photographed. Once the object 50 is centered, cameras A–D each capture a first image of the object 50 with the turntable 100 stationary, i.e. rotated 0 degrees with respect to a reference marker "X". These images are then labeled A1, B1, C1, and D1 based on which camera captured the image. The turntable 100 is then rotated 30 degrees, and the cameras A–D each capture a second image of the object 50. These images are then labeled A2, B2, C2, and D2. This image capturing process is repeated in predetermined increments, in this case, 30 degree increments, until the turn table 100 has rotated 360 degrees and each of the cameras A–D have taken 12 images of the object 50 for a total of 48 images.

Each of the cameras A–D are connected to a computer 104 including a frame grabber 106 for controlling the cameras A–D. The frame grabber 106 activates each of the cameras A–D and stores the captured images in the memory of computer 104. As described above, preferably each camera will take twelve images. Camera A's images are labeled A1–A12, camera B's images are labeled B1–B12 and cameras C and D's images are labeled the same way. When the studio processing of the object 50 is complete, there are a total of forty-eight images of object 50 stored in the computer 104.

It should be noted, however, that although in the preferred embodiment described above, the turntable 100 is rotated 360 degrees and 12 images are taken of the object, it is also possible to vary the amount the turntable 100 is rotated and the number of images taken of the object.

II. Computer Processing the Images

Figure 2A:
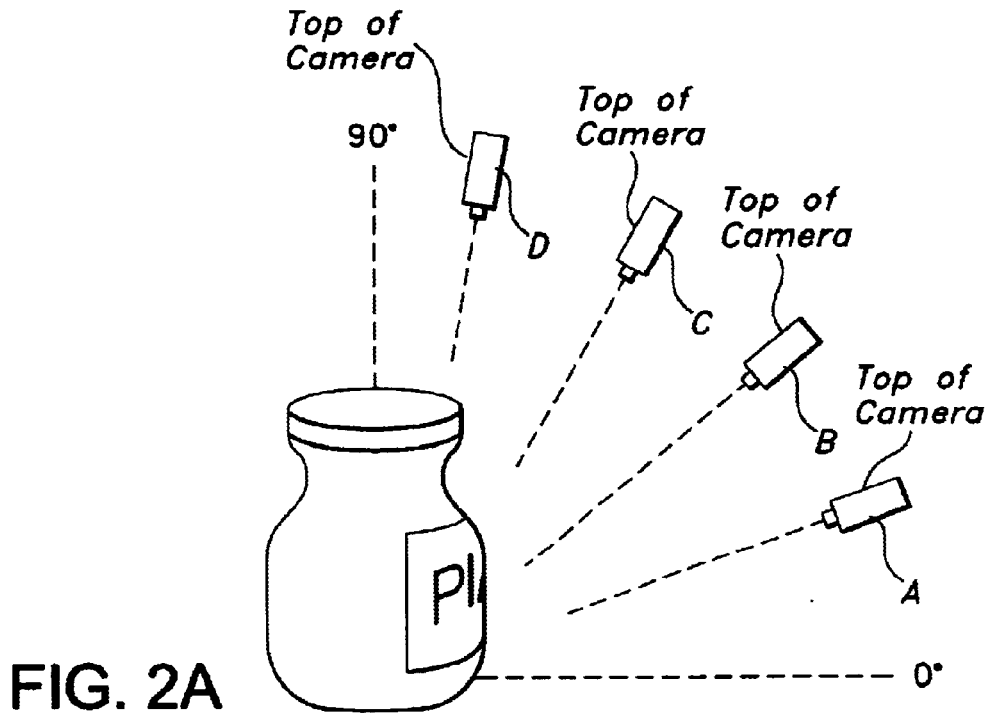
FIG. 2A illustrates the positioning of the digital cameras when capturing the images of the object.
Figure 2B:
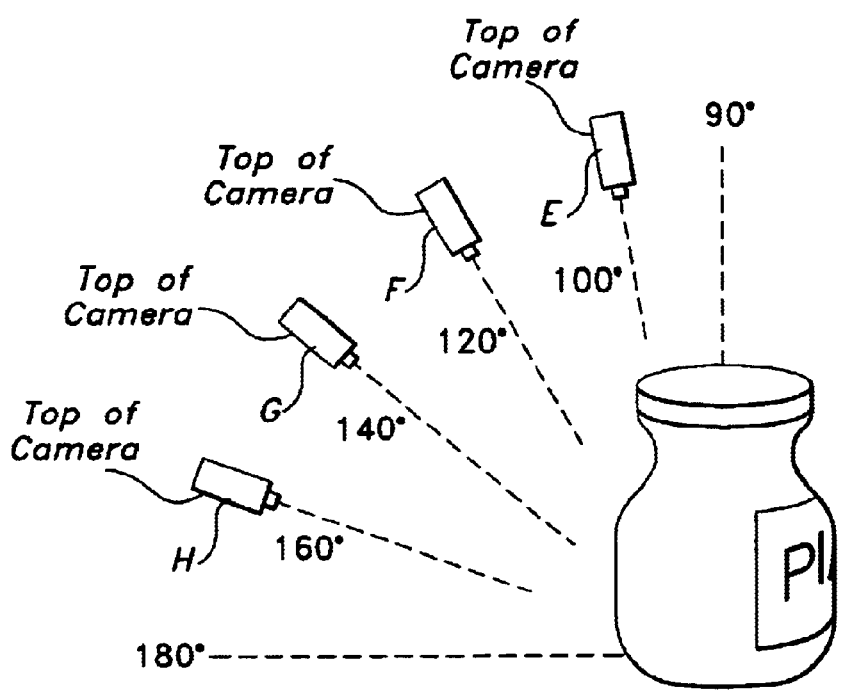
FIG. 2B illustrates the positioning of the cameras in relation to the object that is created through the virtual images.
Figure 3:
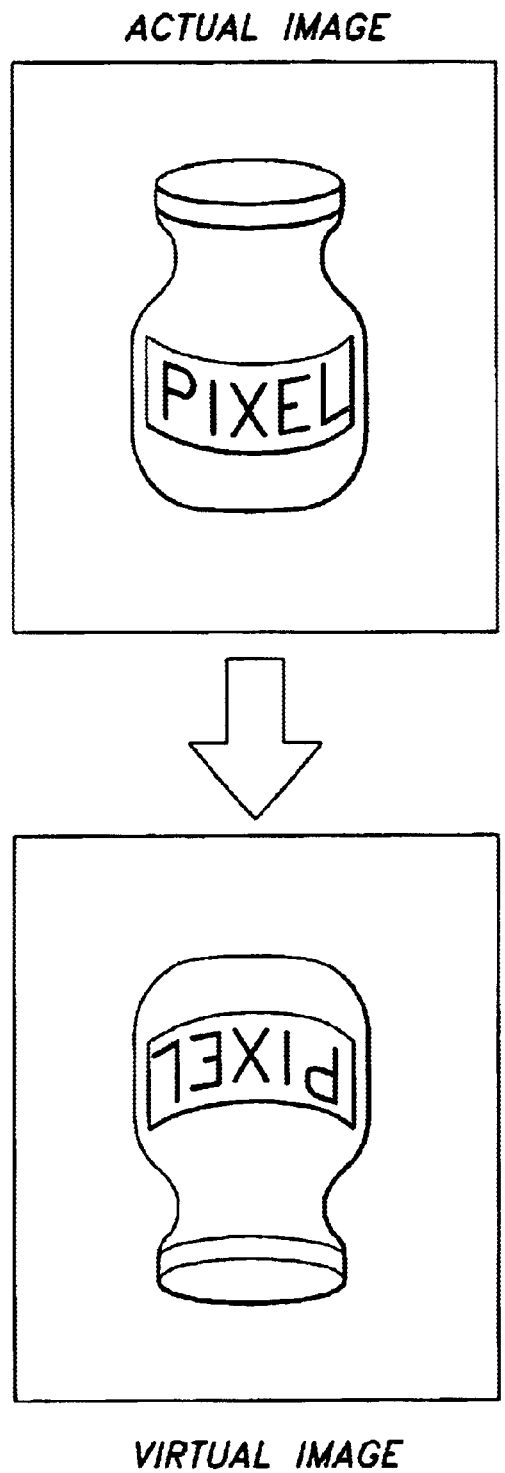
FIG. 3 is a diagram illustrating an example of a virtual image created from an actual image.

After the studio processing is completed, forty-eight images (A–D12) of object 50 are stored in the computer 104. From these forty-eight images, computer software is used to create forty-eight virtual images of object 50. These virtual images of object 50 are computer generated views of the object from different perspectives. To further explain, the 48 actual images are views of object 50 from approximately 0 to 90 degrees on an arcuate vertical plane. However, in order to create an interactive 3D view of object 50, the views of the object from approximately 90 to 180 degrees are necessary. The forty-eight virtual images created from the actual images of object 50 are the views of object 50 from approximately 90 to 180 degrees. To create virtual images the computer rotates the actual image 180° or flips and reverses the actual image. FIGS. 2A, 2B and 3 are diagrams illustrating the relationship of the virtual images generated by the computer 104 compared to the actual images taken of object 50.

FIG. 2A is a diagram illustrating the positioning of the digital cameras when capturing the images of the object. As illustrated in FIG. 2A, camera A captures an images of object 50 from 20 degrees. Cameras B–D take image of object 50 along the same vertical plane as camera A, from 40 degrees to 80 degrees. These four images (A1, B1, C1, and D1) are then used to simulate a single camera moving up and over the object 50 in the same vertical plane. However, there are no cameras at 100 degrees, 120 degrees, 140 degrees, and 160 degrees to capture the images of object 50 from these perspectives that are necessary in order to provide an interactive 3D image. Therefore, the virtual images are created from the actual images taken of object 50 to simulate the images that cameras at 100 degrees, 120 degrees, 140 degrees and 160 degrees would capture.

FIG. 2B illustrates the positioning of the virtual cameras in relation to the object that is created through the virtual images. In FIG. 2B, virtual cameras E–H are presented to better illustrate what is represented by the virtual images (i.e. the images of object 50 from approximately 90 to 180 degrees in a single vertical plane). Therefore, by combining the actual images with the virtual images, a 3D image is created in which, a user can rotate the image from 0 degrees, up and over the object, to 180 degrees.

It should be noted, however, that the virtual images E1–H1 are not created from actual images A1–D1, but from A7–D7. This is because E1–H1 are the virtual images of the opposite side of object 50 from images A1–D1 and images A7–D7 are taken when the turn table 100 has been rotated 180 degrees, thereby exposing the opposite side of object 50 to cameras A–D. The actual images A1–D1 are used to create the virtual images E7–H7. An example of a virtual image created from an actual image is illustrated in FIG. 3. As a result, the eight images, both actual and virtual, making up the 0 to 180 degree view of object 50 along the single vertical plane are A1, B1, C1, D1, E1, F1, G1, and H1 or coming from the other direction A7, B7, C7, D7, E7, F7, G7, and H7. Tables 1–4 below illustrate the detailed manner in which the virtual images are created from actual images.

It should noted that the computer processing "flip & reverse" can also be "reverse & flip", or any other image processing techniques that achieves the same or similar results may be used. Also, in the computer image process rotation, the degree rotated may be varied to achieve different viewing effects. Further, the process of creating the virtual images may also be performed either before or after image compression and re-sampling, which will be described here in below.

Tables 1–4 provided herein below, further illustrate the relationship between the actual images and the virtual images.

TABLE 1

Computer Image Processing for Virtual Images E1–E12

| Actual Image from camera D, which is at an 80° viewing plane. | Actual Image with Turn Table rotated: | Computer Image Processing | Virtual Image from Virtual Camera E, which is at a 100° viewing plane. | Virtual Image with the turn table rotated: |
|---|---|---|---|---|
| D7 | 180° | Rotate D7 by 180° (or flip & reverse) | E1 | 180° + 180° = 0° |
| D8 | 210° | Rotate D8 by 180° (or flip & reverse) | E2 | 210° + 180° = 30° |
| D9 | 240° | Rotate D9 by 180° (or flip & reverse) | E3 | 240° + 180° = 60° |
| D10 | 270° | Rotate D10 by 180° (or flip & reverse) | E4 | 270° + 180° = 90° |
| D11 | 300° | Rotate D11 by 180° (or flip & reverse) | E5 | 300° + 180° = 120° |
| D12 | 330° | Rotate D12 by 180° (or flip & reverse) | E6 | 330° + 180° = 150° |
| D1 | 0° | Rotate D1 by 180° (or flip & reverse) | E7 | 0° + 180° = 180° |
| D2 | 30° | Rotate D2 by 180° (or flip & reverse) | E8 | 30° + 180° = 210° |

TABLE 1-continued

Computer Image Processing for Virtual Images E1–E12

| Actual Image from camera D, which is at an 80° viewing plane. | Actual Image with Turn Table rotated: | Computer Image Processing | Virtual Image from Virtual Camera E, which is at a 100° viewing plane. | Virtual Image with the turn table rotated: |
|---|---|---|---|---|
| D3 | 60° | Rotate D3 by 180° (or flip & reverse) | E9 | 60° + 180° = 240° |
| D4 | 90° | Rotate D4 by 180° (or flip & reverse) | E10 | 90° + 180° = 270° |
| D5 | 120° | Rotate D5 by 180° (or flip & reverse) | E11 | 120° + 180° = 300° |
| D6 | 150° | Rotate D6 by 180° (or flip & reverse) | E12 | 150° + 180° = 330° |

TABLE 2

Computer Image Processing for Virtual Images F1–F12

| Actual Image from camera C, which is at a 60° viewing plane. | Actual Image with Turn Table rotated: | Computer Image Processing | Virtual Image from Virtual Camera F, which is at a 120° viewing plane. | Virtual Image with the turn table rotated: |
|---|---|---|---|---|
| C7 | 180° | Rotate C7 by 180° (or flip & reverse) | F1 | 180° + 180° = 0° |
| C8 | 210° | Rotate C8 by 180° (or flip & reverse) | F2 | 210° + 180° = 30° |
| C9 | 240° | Rotate C9 by 180° (or flip & reverse) | F3 | 240° + 180° = 60° |
| C10 | 270° | Rotate C10 by 180° (or flip & reverse) | F4 | 270° + 180° = 90° |
| C11 | 300° | Rotate C11 by 180° (or flip & reverse) | F5 | 300° + 180° = 420° |
| C12 | 330° | Rotate C12 by 180° (or flip & reverse) | F6 | 330° + 180° = 450° |
| C1 | 0° | Rotate C1 by 180° (or flip & reverse) | F7 | 0° + 180° = 180° |
| C2 | 30° | Rotate C2 by 180° (or flip & reverse) | F8 | 30° + 180° = 210° |
| C3 | 60° | Rotate C3 by 180° (or flip & reverse) | F9 | 60° + 180° = 240° |
| C4 | 90° | Rotate C4 by 180° (or flip & reverse) | F10 | 90° + 180° = 270° |
| C5 | 120° | Rotate C5 by 180° (or flip & reverse) | F11 | 120° + 180° = 300° |
| C6 | 150° | Rotate C6 by 180° (or flip & reverse) | F12 | 150° + 180° = 330° |

TABLE 3

Computer Image Processing for Virtual Images G1–G12

| Actual Image from camera B, which is at a 40° viewing plane. | Actual Image with Turn Table rotated: | Computer Image Processing | Virtual Image from Virtual Camera G, which is at a 140° viewing plane. | Virtual Image with the turn table rotated: |
|---|---|---|---|---|
| B7 | 180° | Rotate B7 by 180° (or flip & reverse) | G1 | 180° + 180° = 0° |
| B8 | 210° | Rotate B8 by 180° (or flip & reverse) | G2 | 210° + 180° = 30° |
| B9 | 240° | Rotate B9 by 180° (or flip & reverse) | G3 | 240° + 180° = 60° |
| B10 | 270° | Rotate B10 by 180° (or flip & reverse) | G4 | 270° + 180° = 90° |
| B11 | 300° | Rotate B11 by 180° (or flip & reverse) | G5 | 300° + 180° = 120° |
| B12 | 330° | Rotate B12 by 180° (or flip & reverse) | G6 | 330° + 180° = 150° |

TABLE 3-continued

Computer Image Processing for Virtual Images G1–G12

| Actual Image from camera B, which is at a 40° viewing plane. | Actual Image with Turn Table rotated: | Computer Image Processing | Virtual Image from Virtual Camera G, which is at a 140° viewing plane. | Virtual Image with the turn table rotated: |
|---|---|---|---|---|
| B1 | 0° | Rotate B1 by 180° (or flip & reverse) | G7 | 0° + 180° = 180° |
| B2 | 30° | Rotate B2 by 180° (or flip & reverse) | G8 | 30° + 180° = 210° |
| B3 | 60° | Rotate B3 by 180° (or flip & reverse) | G9 | 60° + 180° = 240° |
| B4 | 90° | Rotate B4 by 180° (or flip & reverse) | G10 | 90° + 180° = 270° |
| B5 | 120° | Rotate B5 by 180° (or flip & reverse) | G11 | 120° + 180° = 300° |
| B6 | 150° | Rotate B6 by 180° (or flip & reverse) | G12 | 150° + 180° = 330° |

TABLE 2

Computer Image Processing for Virtual Images H1–H12

| Actual Image from camera A, which is at a 20° viewing plane. | Actual Image with Turn Table rotated: | Computer Image Processing | Virtual Image from Virtual Camera H, which is at a 160° viewing plane. | Virtual Image with the turn table rotated: |
|---|---|---|---|---|
| A7 | 180° | Rotate A7 by 180° (or flip & reverse) | H1 | 180° + 180° = 0° |
| A8 | 210° | Rotate A8 by 180° (or flip & reverse) | H2 | 210° + 180° = 30° |
| A9 | 240° | Rotate A9 by 180° (or flip & reverse) | H3 | 240° + 180° = 60° |
| A10 | 270° | Rotate A10 by 180° (or flip & reverse) | H4 | 270° + 180° = 90° |
| A11 | 300° | Rotate A11 by 180° (or flip & reverse) | H5 | 300° + 180° = 120° |
| A12 | 330° | Rotate A12 by 180° (or flip & reverse) | H6 | 330° + 180° = 150° |
| A1 | 0° | Rotate A1 by 180° (or flip & reverse) | H7 | 0° + 180° = 180° |
| A2 | 30° | Rotate A2 by 180° (or flip & reverse) | H8 | 30° + 180° = 210° |
| A3 | 60° | Rotate A3 by 180° (or flip & reverse) | H9 | 60° + 180° = 240° |
| A4 | 90° | Rotate A4 by 180° (or flip & reverse) | H10 | 90° + 180° = 270° |
| A5 | 120° | Rotate A5 by 180° (or flip & reverse) | H11 | 120° + 180° = 300° |
| A6 | 150° | Rotate A6 by 180° (or flip & reverse) | H12 | 150° + 180° = 330° |

III. Sphering the Object

Figure 4:
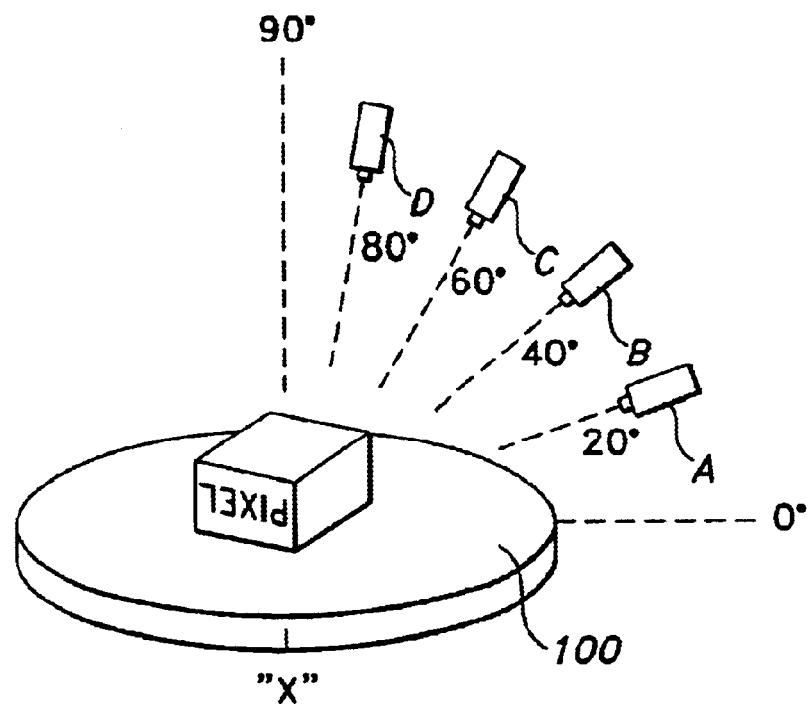
FIG. 4 is a diagram illustrating sphering an object.

The images of the object captured in the two above steps, both the actual images and the virtual images, enable creating an interactive 3D display in the shape of a semi-sphere of the object 50. In order to sphere the object, the object 50 is placed in the center of the turntable 100 upside down and the inverted object 50 is studio processed and computer image processed by the same apparatus as illustrated in FIG. 1. The result is an interactive 3D display in the shape of a semi-sphere of the inverted object 50. FIG. 4 is a diagram illustrating sphering the object. By combining the two sets of semi-sphere images, a 360° interactive 3D image of the object is created. In other words, an interactive 3D display in the shape of a sphere of the object is created.

IV. Image Compression and Re-Sampling

After the images of the object are taken and processed, the next step is compressing the images to reduce the memory required to display the images and re-sampling the images in different sizes to interactively display them. In the preferred embodiment of the present invention, the images are compressed and re-sampled into four different sizes of compressed images. The compressed images are then stored, respectively, as B (Best View Images), S (Small Size Images), M (Medium Size Images), and L (Large Size Images). A user then has the choice of displaying the different sized images of the object 50.

V. Interactively Displaying the 3D Image

After completing steps I–IV illustrated above, it is possible to display the interactive 3D image with the re-sampled compressed images. The present invention is applicable to any type of electronic visual display but for simplicity, will be described herein below with reference to a web page display on a computer.

Figure 5A:
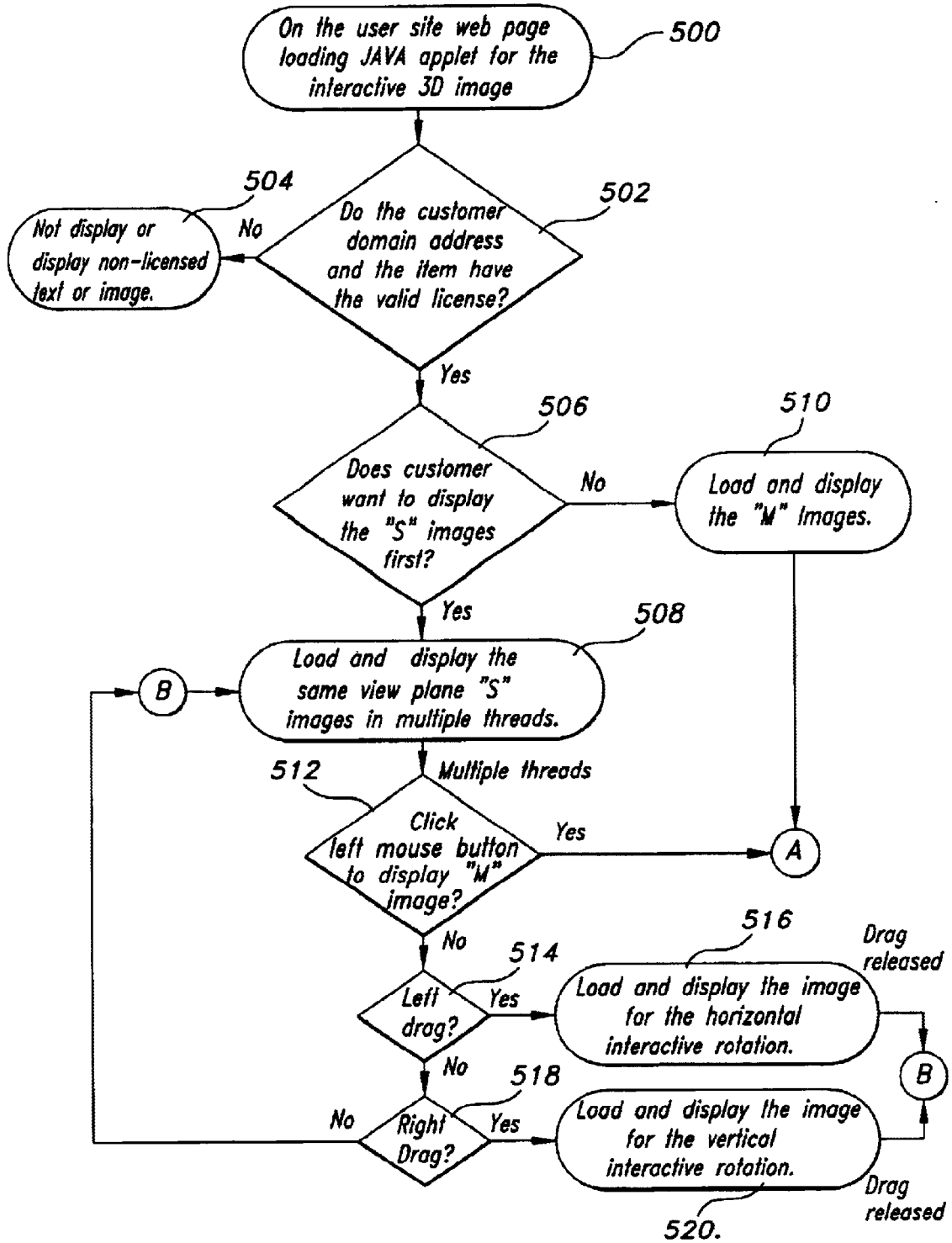
FIGS. 5A–5C are flow charts illustrating a method of displaying an interactive 3D image according to the present invention.
Figure 5B:
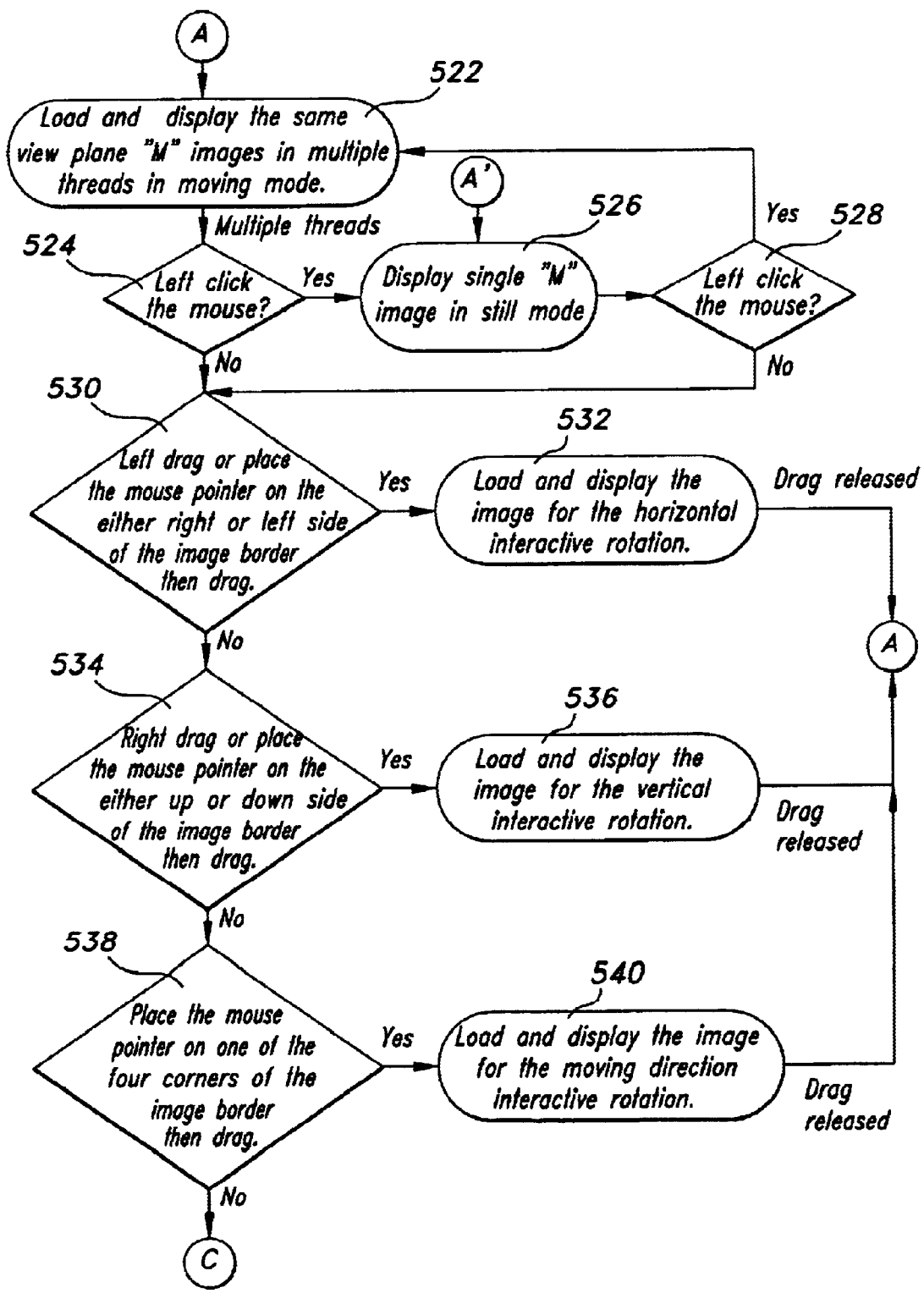
Figure 5C:
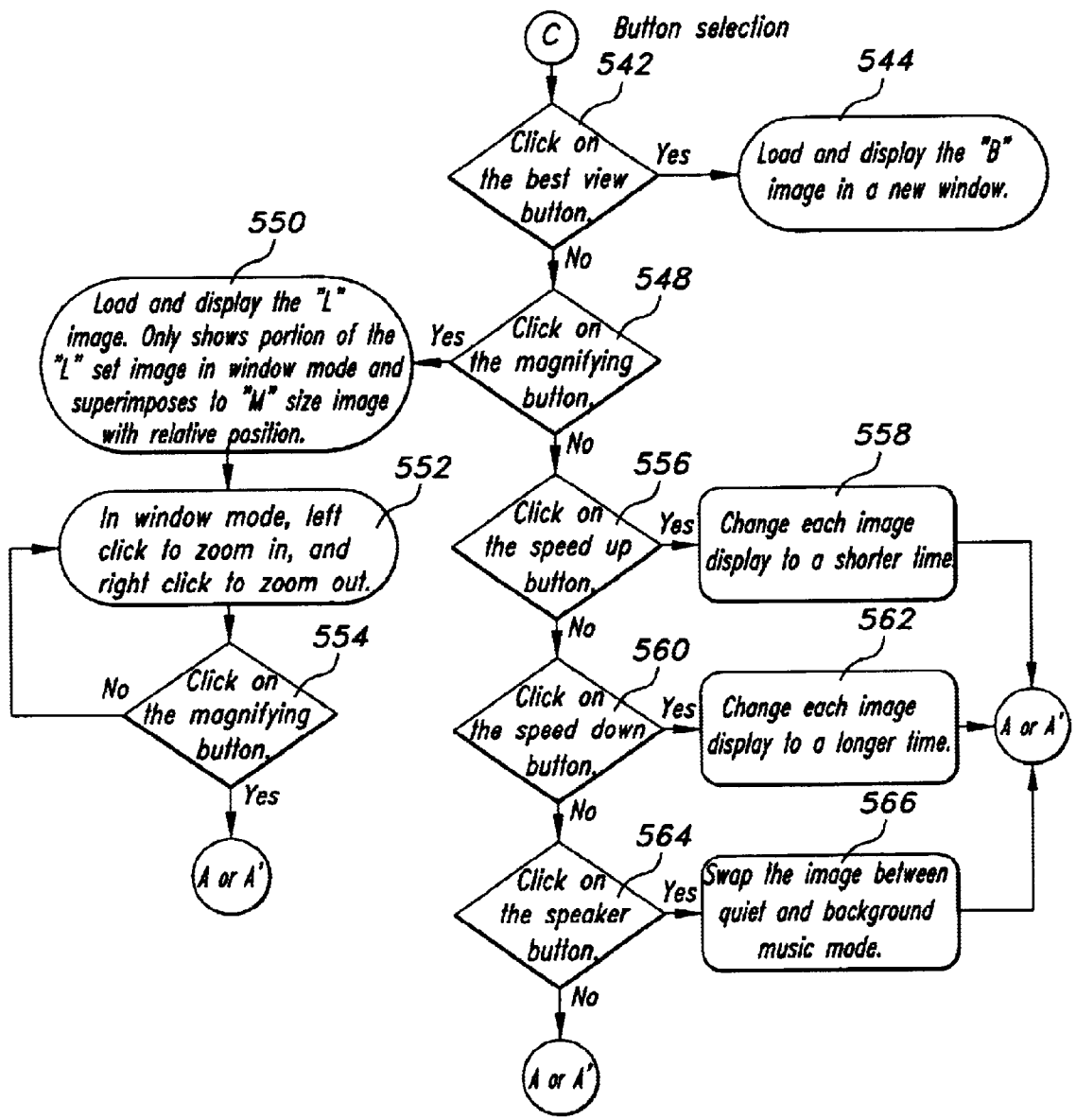

FIGS. 5A–5C are flow charts illustrating a method of displaying an interactive 3D image according to the present invention. In FIG. 5A, when a viewer logs on to a user web site utilizing interactive 3D image displays of the present invention, a program code such as a JAVA applet for the interactive 3D image is loaded in step 500. It is then determined whether the viewer has a license to view the web site in step 502. If yes, the viewer is directed to select which size image to view in step 506, and if not, the viewer is redirected from the site to a message indicating why access is denied in step 504.

If the viewer selects the smaller image "S" in step 506, the S image is loaded and displayed in step 508. At this point, in step 512, the viewer has the option of enlarging the image by left clicking a mouse over the image or selecting a respective icon and loading a larger image. If the image size is acceptable to the viewer in step 512, the viewer can interactively manipulate the image (rotate the image horizontally or vertically) in steps 514 and 518. If the viewer chooses to manipulate the image in steps 514 and 518, for example, by either right clicking or left clicking a mouse and dragging, the object is manipulated in steps 516 and 520 respectively. If in step 514 the viewer left clicks and drags the mouse, the image is rotated horizontally in step 516. If the viewer right clicks and drags in step 518, the image is rotated vertically in step 520. When the user has finished rotating, the process returns to step 508.

If the viewer had chosen the larger image in step 506, moving the process to step 510, or decided to enlarge the image in step 512, the process then moves to step 522 in FIG. 5B. In step 522, the larger image (medium sized image "M") is loaded and rotates automatically in the horizontal direction. By left clicking the mouse on the image in step 524 the image stops rotating and is displayed as a still image in step 526. By left clicking on the still image again in step 528 the image continues rotating horizontally, returning to step 522. In step 530, if the viewer left clicks and drags or positions the mouse pointer on the side borders of the image, the viewer controls horizontal rotation in step 532. In step 534, if the viewer right clicks and drags or positions the mouse pointer on the top or bottom borders of the image, the viewer controls vertical rotation of the image in step 536. In step 538, if the viewer places the mouse pointer in any of the four corners of the image, the image is rotated in the diagonal direction in step 540. After either step 532, 536, or 540, when the user stops rotating the object in the respective direction, the process returns to step 522.

FIG. 5C is a continuation of the flow chart illustrated in FIGS. 5A and 5B, and further demonstrates the possible manipulations of the displayed image. In FIG. 5C, the viewer can select the best view "B" image of the displayed object in step 542. If the user selects the best view icon, the B image is loaded in a new window as a still image in step 544. In a more advanced wider bandwidth network environment, all the manipulations performed on the images can be performed on the best view B image.

Figure 6:
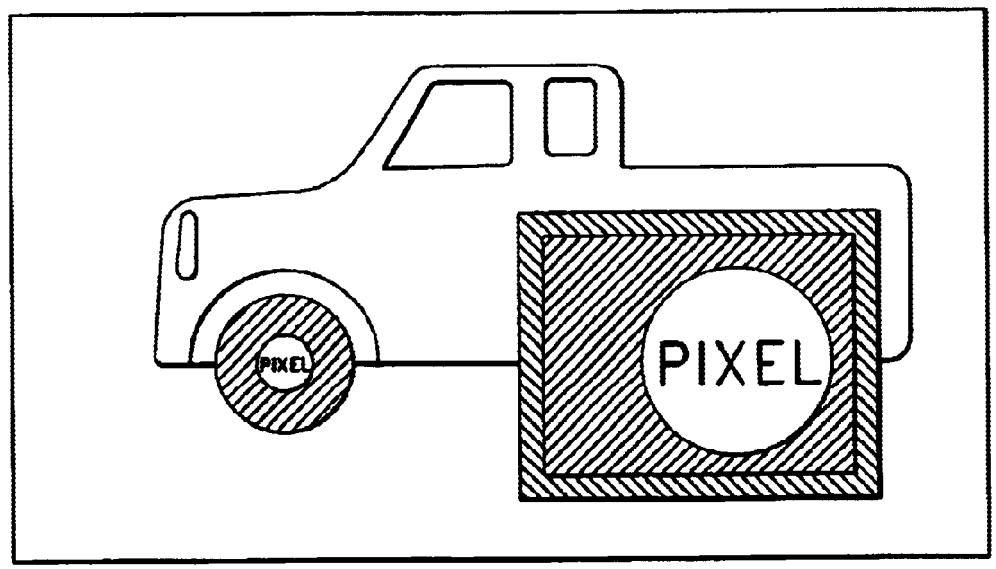
FIG. 6 is an example of a display with a magnifying window open.

If the best view is not selected in step 542, the viewer can select the magnifying icon in step 548. When selected, a moveable viewing window opens over the image and the large "L" images are displayed in the window in step 550. The L sized images displayed in the magnifying window are magnified images of the object being displayed relative to the windows positioned over the full view M sized image. FIG. 6 is an example of a display with the magnifying window opened. In the magnifying window mode, the viewer can left click to zoom in further, and right click to zoom back out in step 552. By clicking on the magnifying icon again, the magnifying window is closed in step 554 and the images returns to automatic rotation in step 522 or a still mode in step 526.

The viewer has the option of speeding up or slowing down the automatic rotation in steps 556 and 560, by selecting a plus or minus icon displayed with the image. If in step 556 the user chooses to speed up the rotation of the image, each individual image is displayed for a shorter amount of time in step 558. If in step 560, the user chooses to slow down the rotation of the image, each individual image is displayed for a longer amount of time. Also, in step 564, the viewer may select viewing the image in a music mode by selecting the music icon that turns the sound on and off in step 566.

After all the image manipulations described in steps 558, 562, 564, and 566, when user is finished, the process returns to step 522 or step 526.

While a preferred embodiment of the present invention has been described herein above, it will be understood by those skilled in the art that various changes in form and detail may be made therein without departing from the spirit and scope of the invention as defined by the appended claims. For example, in the step of studio processing the object a different number of cameras could be used, the angles between the cameras can be different, the number of images taken can be changed, and different types of camera could be used. Instead of using digital cameras capturing still images, video cameras could be used or film type cameras could be used and the developed images could then be loaded into the computer using a scanner, by way of example.

When compressing and re-sampling the images, the order of compressing and re-sampling can be varied, as well as the number re-sized images, i.e. six different sizes. Also, the images can be compressed using any number of methods.

What is claimed is:

1. A method for viewing images of an object in three dimensions (3D), the method comprising the steps of:
    collecting a plurality of images of at least one object to be viewed;
    creating a plurality of virtual images, the virtual images being created from collected images that are inverse of the created virtual images;
    compressing and re-sampling the virtual images for interactive 3D display; and
    displaying the interactive 3D images, wherein the images are rotatable.

2. The method as recited in claim 1, further comprising a step of sphering the interactive 3D images.

3. The method as recited in claim 2, wherein the step of sphering further comprises the steps of:
    inverting and centering the object;
    processing the inverted object into inverted images;
    processing the inverted images to create virtual inverted images; and
    combining the processed images of the object with the processed images of the inverted object to create a 360 degree sherical view of the object.

4. The method as recited in claim 1, wherein the step of collecting comprises:
    a) positioning a plurality of cameras in an arcuate plane aimed at the object, each of said plurality of cameras being positioned at an independent angle;
    b) photographing the object with each camera;
    c) changing position of the object according to a predetermined plan of positions; and d) repeating steps (b) and (c) until all the predetermined positions are photographed.

5. The method as recited in claim 4, wherein the step of positioning further comprises the steps of:
   positioning a first camera at twenty degrees from a horizontal even with a top surface on which the object is placed;
   positioning a second camera at twenty degrees from the first camera;
   positioning a third camera at twenty degrees from the second camera; and
   positioning a fourth camera at twenty degrees from the third camera.

6. The method as recited in claim 1, wherein the step of creating virtual images further comprises the steps of:
   storing the plurality of collected images; and
   utilizing computer software to create from the collected plurality of images, the virtual images of the object viewed from different perspectives.

7. The method as recited in claim 1, wherein the step of compressing and re-sampling further comprises the step of creating a plurality of views of the object for interactive 3D display.

8. The method as recited in claim 7, wherein the plurality of views of the object includes a best view and a plurality of views of different sizes.

9. The method as recited in claim 7, wherein the step of displaying the interactive 3D images further comprises the steps of:
   loading a program code for displaying the interactive 3D images into a computing device;
   selecting said at least one object to display;
   displaying at least one of a plurality of views of the selected object;
   providing a direction for the display of a next view of the plurality of views of the selected object, wherein said direction is selected from one of diagonal, horizontal and vertical;
   displaying said plurality of views of the selected object to simulate rotation of the selected object along the provided direction.

10. The method as recited in claim 9, wherein the step of selecting further comprises selecting a best view.

11. The method as recited in claim 9, wherein said step of displaying said plurality of views is performed automatically.

12. The method as recited in claim 11, wherein the step of displaying said plurality of views automatically, further comprises a step of controlling a rotation speed.

13. The method as recited in claim 9, wherein the step of displaying further comprises a step of magnifying an area of the object by positioning a window shape over the area to be magnified and displaying magnified views of the area within said positioned window.

14. The method as recited in claim 9, wherein the step of displaying further comprises a step of magnifying an area of the object by positioning a window shape over the area to be magnified and displaying magnified views of the area within said positioned window.

15. A method for viewing images of an object, the images simulating a three dimensional object on a video display, the method comprising the steps of:
   positioning a plurality of cameras in an arcuate plane aimed at the object, each of said plurality of cameras being positioned at independent angles;
   collecting a plurality of images of the object to be viewed by repeatedly re-positioning and photographing the object with each camera;
   creating from the collected plurality of images a plurality of virtual images, the virtual images being equivalent to the images of the object viewed from different perspectives;
   sphering the collected images by inverting and processing the collected images into virtual inverted images, wherein when said collected, sphered, and inverted images are displayed, a 360 degree spherical view of the object is created; and
   compiling said collected, created, and sphered images into object views associated with the object.

16. The method of claim 15, further comprising the steps of:
   providing a selection of a plurality of object identifiers, said object identifiers having a one to one correspondence with the objects;
   selecting at least one object identifier of said plurality of object identifiers corresponding to an object to be displayed;
   displaying at least one of the plurality of object views of the object to be displayed;
   determining a directional axis and a lateral direction along said directional axis along which a display of three-dimensional rotation of the object will be displayed, wherein said direction is selected from one of diagonal, horizontal and vertical;
   simulating the three dimensional rotation of the object by displaying said plurality of object views in sequence to imitate rotation of the object along the determined directional axis and along determined lateral direction.

17. The method claim 16, wherein the step of simulating is performed automatically and a speed of said simulation is controlled by a user.

* * * * *